United States Patent [19]
Boldt et al.

[11] Patent Number: 5,377,334
[45] Date of Patent: Dec. 27, 1994

[54] FAST ASYNCHRONOUS RESOURCE MASTER-SLAVE COMBINATION

[75] Inventors: Gerald D. Boldt, Longmont, Colo.; Stephen D. Hanna, Tucson, Ariz.; Robert E. Vogelsberg, Boulder, Colo.

[73] Assignee: International Business Machines Corporation, Armonk, N.Y.

[21] Appl. No.: 974,375

[22] Filed: Nov. 10, 1992

Related U.S. Application Data

[63] Continuation of Ser. No. 590,118, Sep. 28, 1990, abandoned.

[51] Int. Cl.⁵ .................................... G06F 13/368
[52] U.S. Cl. .................. 395/325; 364/DIG. 1; 364/229.2; 364/230.4; 364/240.4; 364/270.5
[58] Field of Search .................. 395/725, 325, 550

[56] References Cited

U.S. PATENT DOCUMENTS

| | | | |
|---|---|---|---|
| 3,886,524 | 5/1975 | Appelt | 395/325 |
| 3,997,896 | 12/1976 | Cassarino, Jr. et al. | 395/325 |
| 4,084,233 | 4/1978 | Handly et al. | 395/800 |
| 4,106,104 | 8/1978 | Nitta et al. | 395/325 |
| 4,148,011 | 4/1979 | McLagan et al. | 395/325 |
| 4,181,974 | 1/1980 | Lemay et al. | 395/200 |
| 4,384,327 | 5/1983 | Conway et al. | 395/325 |
| 4,390,969 | 6/1983 | Hayes | 395/550 |
| 4,660,169 | 4/1987 | Norgren et al. | 395/325 |
| 4,779,089 | 10/1988 | Theus | 340/825.5 |
| 4,803,481 | 2/1989 | Mueller et al. | 340/825.5 |
| 4,817,037 | 3/1989 | Hoffman et al. | 395/325 |
| 4,821,170 | 4/1989 | Bernick et al. | 395/275 |
| 4,847,750 | 7/1989 | Daniel | 395/425 |
| 4,887,262 | 12/1989 | van Veldhuizen | 370/85.1 |
| 4,888,684 | 12/1989 | Lilja | 395/325 |
| 5,001,624 | 3/1991 | Hoffman | 395/375 |

Primary Examiner—Debra A. Chun
Attorney, Agent, or Firm—Carl M. Wright; Saul A. Seinberg

[57] ABSTRACT

Resource master and slave combinations operating from separate local clocks asynchronously even though there may be wide speed variations among the devices, eliminating the need to synchronize the trailing edges of generated control signals with the local clock so as to free access to the resource as soon as possible without introducing timing or logic hazards.

3 Claims, 5 Drawing Sheets

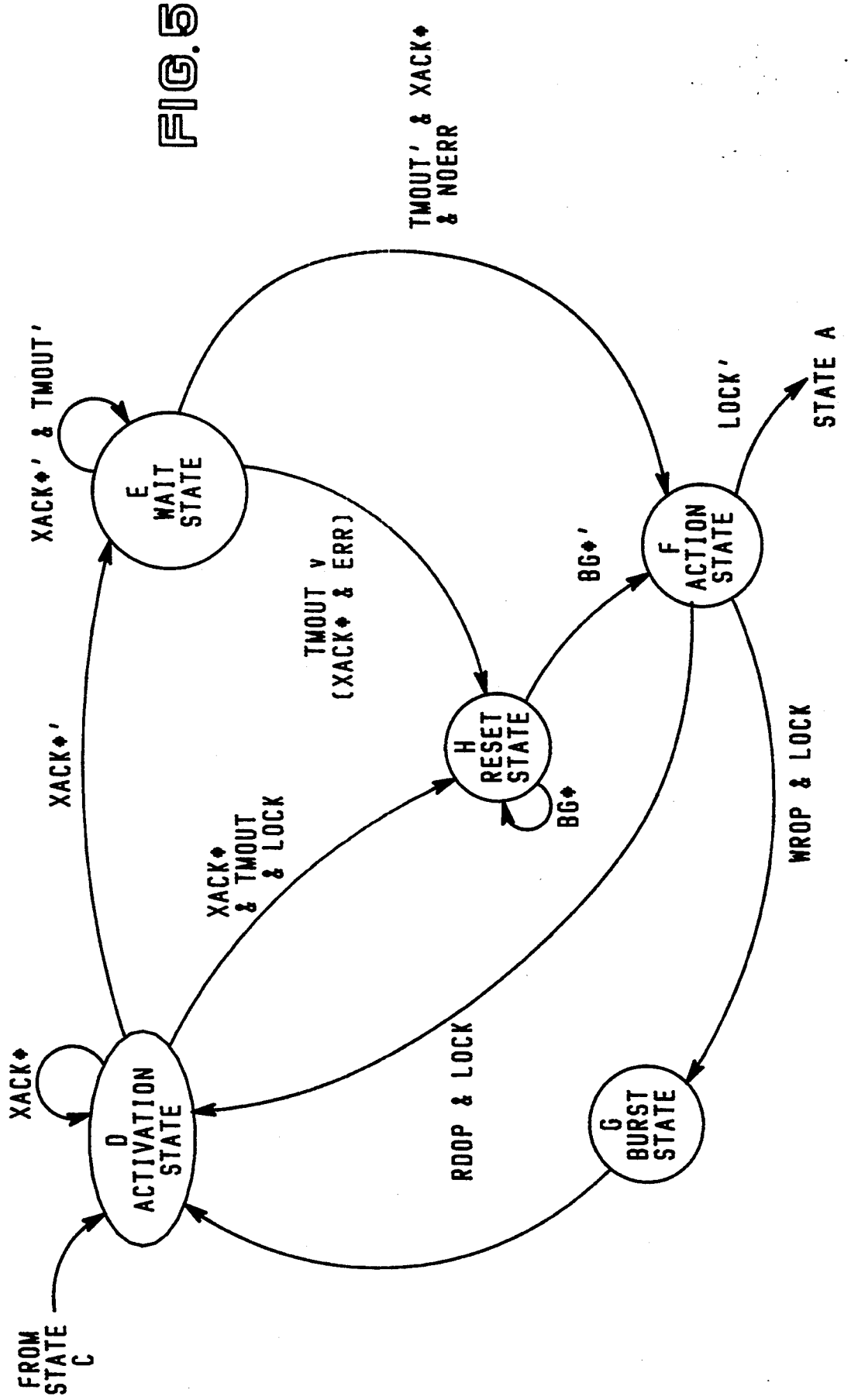

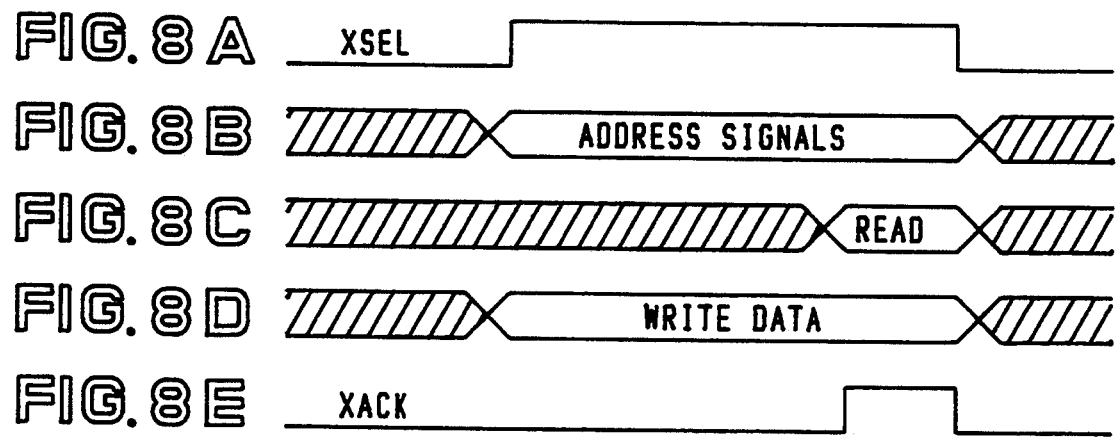

FAST ASYNCHRONOUS RESOURCE MASTER-SLAVE COMBINATION

CROSS-REFERENCE TO RELATED APPLICATIONS

This is a continuation of copending application Ser. No. 07/590,118 filed Sep. 28, 1990, and now abandoned.

This application is related to co-pending patent application Ser. No. 07/589,718 filed on Sep. 28, 1993, now abandoned in favor of continuation patent application Ser. No. 07/908,931 filed on Jul. 6, 1992 ,titled ASYNCHRONOUS DAISY CHAIN ARBITER WITH FALSE SIGNAL LOCKOUT, assigned to the same assignee as the present patent application.

BACKGROUND AND SUMMARY OF THE INVENTION

This invention relates to the control of data processing system resources by a plurality of devices using control masters and control slaves. It relates particularly to a network of devices of varying speeds and capacities where any control master must operate with any control slave for proper utilization of the resources. In a more specific application, it relates to bus control masters and bus control slaves in a system where the bus masters contend for access and control of a bus and, once gained through an arbitration controller, the bus control master and the bus control slave cooperate asynchronously to effect data transfers.

Electronic computer systems usually require that the processor have access to input and output devices for useful functioning. For most efficient operation, such devices operate independently from the central processor. That is, unlike early computer systems where the devices were controlled by the central processing unit, modern design moves the processing function into the device, permitting the central processor and the devices to function simultaneously and independently. At times, however, the devices must access resources shared with other devices and with the central processor. For example, a memory is often a shared resource and is accessed via a system bus. Various processors operate on data stored in the memory and some devices are used to store data from outside the system into the memory for processing while other devices read data from the memory for use outside the system, e.g., printing the results of computation and processing.

To reduce interference with the workings of the processor, a technique known as Direct Memory Access (DMA) is used to enable devices to read from or write to the memory without requiring processor intervention. The address of the data location in memory is stored in the device and used to address the memory during one or more cycles while the central processor and other devices are inhibited from accessing the memory. The DMA process operates as an interrupt procedure, so called because it doesn't always require access to the memory on a regular, periodic basis and interrupts the central system for access asynchronously. Such processes are also called cycle stealing.

All the devices cannot access the memory bus simultaneously because there would be no way to distinguish the separate signals. Therefore, resource requests must be arbitrated in a way that fulfills the requirements of all the devices. The problem of arbitrating multiple requests is covered in the cross-related, co-pending patent application Ser. No. 07/908,931. When a bus master gets control of the bus, a bus control master circuit operates together with a bus control slave at the system resource to perform the associated functions such as read or write from a DMA device to a memory.

Prior art bus control masters and bus control slaves sample the control signals and synchronize them to the local clock on both the leading and the trailing edges. This is a safe approach in that it avoids timing hazards and incorrect responses to false signals.

Such timing hazards are not always a problem in systems having bus control masters and bus control slaves that are designed to cooperate with one another and where there is a limited number of bus control masters and bus control slaves. In a system that comprises such devices of widely varying operating parameters or where the number of such devices are not to be limited in number, timing hazards create problems that have been avoided by synchronizing the leading and trailing edges of the control signals with the local clock, even in systems labelled asynchronous.

The bus control slave response to the deactivation of the signal that selected it is delayed until the asynchronous select signal is aligned with the local clock which takes two clock cycles. The synchronization to the local clock prevents the bus control slave from responding to a subsequent select signal before the slave's internal sequencing logic has completed aligning its clock with the external signal and returned to its initial state.

Similarly, the bus control master delays activating selection of the next bus control slave until the acknowledge signal from the previously selected bus control slave has been deactivated. This prevents the acknowledge signal from a previously selected bus control slave from being mistaken for the acknowledgement of the next select signal.

The synchronization of the trailing edges of the select and acknowledge signals prevents timing hazards and anomalies that can arise because of the differences in speeds among the masters and slaves that are coupled to a single bus. For example, a fast bus control master can overrun a slower bus control slave, causing the bus control master to remain linked with the slower bus control slave when another bus control slave was actually supposed to have been selected. On the other hand, a fast bus control slave can activate an acknowledge signal to an asynchronous select signal before a slow bus control master detected the deactivation of a previous acknowledge signal, leading to a false bus error indication because the deactivation of the synchronized acknowledge signal must comply with the interlock of the bus controls. Therefore, synchronization of the trailing edges as well as the leading edge has been considered necessary.

The prior art solutions to the problems are set forth in the following references.

U.S. Pat. No. 3,886,524 discloses the connection of several bus masters, each with logic circuits to arbitrate among several requests. The priority is self-determined among the bus masters which are connected by a bus of three lines common to all the logic circuits. The bus master having control of the bus transmits an "access granted" signal. This locks out the other bus masters until the controlling bus master has completed its data transfer.

U.S. Pat. No. 3,997,896 uses two cycles for transferring data between a bus master and a bus slave, one cycle for initiating the data transfer and the second for actually transferring the data. To eliminate the delay between the initiation and the transfer of data between the first pair, a second pair of bus master and bus slave can communicate between the first and second cycle of the first pair.

U.S. Pat. No. 4,084,233 discloses communication channels controlled by a processor to send or receive data from various devices, all of which operate from a common system clock to prevent timing hazards and anomalies.

U.S. Pat. No. 4,106,104 describes a common control unit to control access to a bus by several devices. The transfer process of a low priority device can be interrupted to allow higher priority device to use the bus. The connection of the devices to the common control unit is a special arrangement that allows some devices to be connected to both sides of the control unit.

The system of U.S. Pat. No. 4,148,011 uses a busy signal that is coupled to the devices competing for access to the bus. The control logic is distributed among the competing devices with the common busy line. The common busy line avoids timing hazards by holding off the other bus masters while the bus master controlling the bus is transferring data.

U.S. Pat. No. 4,390,969 discloses an asynchronous data transfer system using a four-cycle signal, also known as Return-to-Zero, scheme wherein the request and acknowledge signals do not overlap. To insure stability and to avoid timing hazards, the edges of the signals generate fixed duration pulses that provide time for the circuit states to stabilize. In contrast, the invention uses a two-cycle, also known as Nonreturn-to-Zero, scheme without the delay caused by a fixed duration pulse.

U.S. Pat. No. 4,660,169 discloses an asynchronous daisy chain arrangement that enables a bus master to seize control of the bus when a Bus Acknowledge (Grant) signal is received without incurring any synchronization delay. The bus master inhibits setting synchronization latches to prevent passing the bus grant signal to the next bus master in the chain by delaying the setting of the latches for a short time period before a Local Bus Request Required signal is issued to insure the stability of the bus grant signal passed when the bus master determines its need for the bus. If the bus master requires control of the bus, it continues to delay the synchronization latch setting long enough to complete its seizing control of the bus and to signal the bus arbiter that it has taken control. The invention in this application eliminates the delays in setting the latches as well as eliminates the timing problem that occurs when a limiting number of bus masters is exceeded.

U.S. Pat. No. 4,779,089 describes a system having asynchronous bus masters but using synchronization signals for controlling the bus to avoid timing hazards as described above when the bus master operation is asynchronous.

U.S. Pat. No. 4,803,481 relates to the use of a call line between a master unit and a slave unit, the master unit communicating when the logic levels of a master line and a slave line are at the same level and the slave unit communicating when the logic levels are different. The direct communication requirements limit the types of bus masters and bus slaves that can be used in a single system and precludes the need to avoid timing hazards.

U.S. Pat. No. 4,817,037 shows a system of overlapping bus cycle operations using a protocol that allows a bus slave to indicate to the designated bus master that a new bus master is to be designated for temporary communication. The communication with a different bus master takes place during the communication with the designated bus master. The operations are controlled by signals that synchronize the signals used for the communication process.

U.S. Pat. No. 4,821,170 shows a plurality of host processors with at least two system buses. DMA devices control the bus arbitration and allocate alternate bus clock cycles in response to request to exchange data between a dedicated microprocessor and a high speed bus. The bus clock cycles actually provide synchronous operation.

U.S. Pat. No. 4,847,750 shows still another approach to data acquisition that uses a dual port frame map memory for storing address of DMA devices in sequence. Data is rapidly transferred from various peripheral devices having nonsequential addresses to sequential locations of the computer and vice versa. This arrangement limits the number and speed variations of devices using the system.

U.S. Pat. No. 4,887,262 relates to asynchronous bus masters using messages comprising an arbitration field and a data field. It depends, however, on synchronizing the operation of the bus masters so that its operation is not wholly asynchronous.

The invention to be described herein is designed to be wholly asynchronous in that the clocks of each device are independent from each other and can run at widely varying rates. The number of bus masters and bus slaves is not limited.

In accordance with the invention, an access controller selects a resource controller to access the resource controlled by the resource controller. In response to a select signal, the resource controller allows access to the resource for utilization of the resource and supplies an acknowledge signal to indicate the resource is being utilized. The acknowledge signal is terminated as soon as the utilization is completed but the access controller retains the signal until it is in a stable state and terminates the select signal. The resource controller retains the select signal until it is in an initial state.

The two controllers operate asynchronously with respect to one another but prevent response to false signals by retaining the signals until they are in stable states.

To prevent system hang up, the access controller terminates the select signal after a predetermined time if no acknowledge signal is received. It also inhibits the select signal if it is possible for more than one resource controller to be selected, e.g., if there is a parity error in the select signal.

BRIEF DESCRIPTION OF THE DRAWING

The invention is described in detail by referring to the various figures which illustrate specific embodiments of the invention, and wherein like numerals refer to like elements.

FIG. 5 is a state diagram of a bus control master state machine for sequencing the latter's functions according to the invention.

FIGS. 8A–8E show the relationship among certain signals that occur in the operation of a system according to the invention.

DESCRIPTION OF THE PREFERRED EMBODIMENT

In the following description, the illustrated embodiment is described in terms of gaining and controlling access to a system bus by one of several bus masters. It is not intended that the invention be limited to bus master operations. It is equally applicable to the access to any common system resource. That is, the invention applies to resource masters in general where requests are made for access to the resource and a resource grant signal is returned to indicate that access may be had to the resource.

Figure 1:
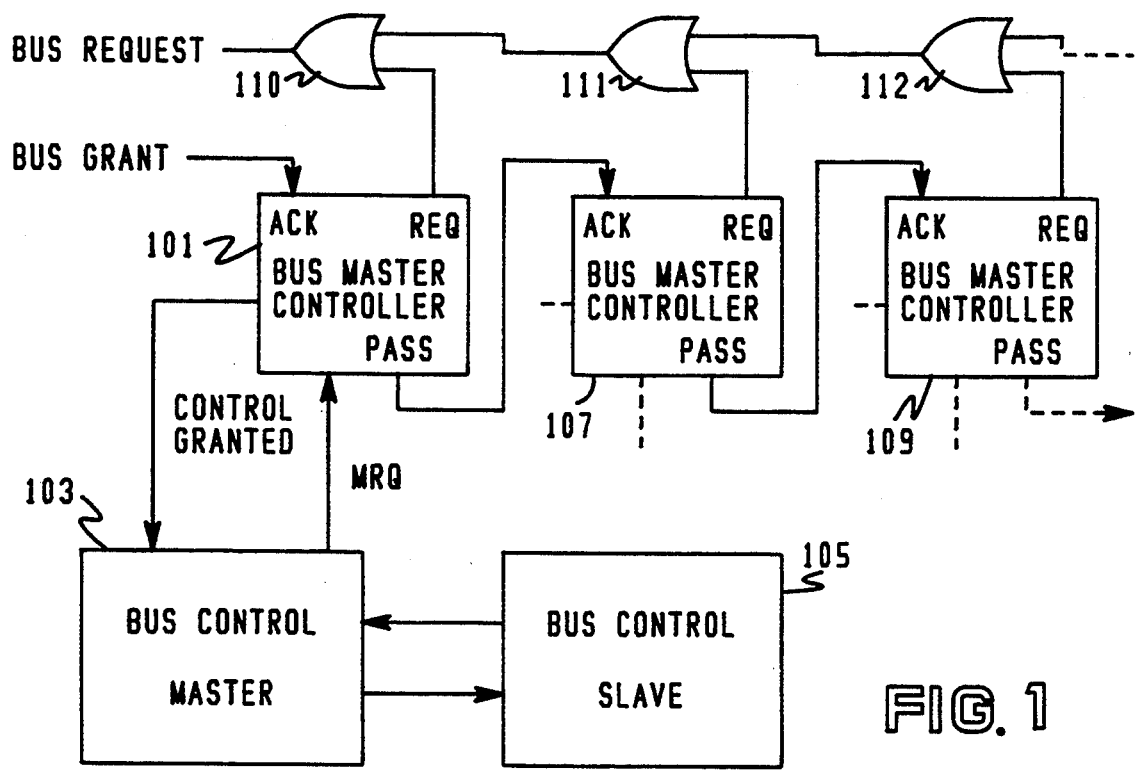
FIG. 1 is a block diagram of a daisy chain resource acquisition system.

FIG. 1, a bus master is shown composed of a control unit 101, a bus control master 103, and a bus control slave 105. Two other controllers 107 and 109 for other bus masters are also shown without the associated bus control masters and bus control slaves. A bus request signal is generated by ORing the REQ signals from each of the bus master controllers using serial OR gates 110–112 in the illustrated embodiment. Serial coupling of the OR function facilitates the addition of more bus masters in the system without the need to change the existing circuits.

A bus grant signal is coupled to the ACK input terminal of the first bus master controller in the chain. Thereafter, the PASS output terminal of each bus master controller is coupled to the ACK input terminals of its next bus master controller.

When a device needs access to the bus, its bus control master supplies a request signal, MRQ, to its bus master controller. When the bus master controller 101 has seized the bus, it sends an appropriate control granted signal to the bus control master. This is synchronized to the local clock in the bus master controller and is supplied to the bus master controller which shares the local clock with its associated bus master controller. The synchronized bus grant signal is labelled BG* in the figures of the drawing and is deactivated by the clock signal following the deactivation of the bus grant signal from the remote resource.

The above description relates to a daisy chain arbiter for bus access. The following description of the actual control of the bus is not limited to any particular type of access request arbiter but is equally applicable to any form of system resource arbitration.

Figure 2:
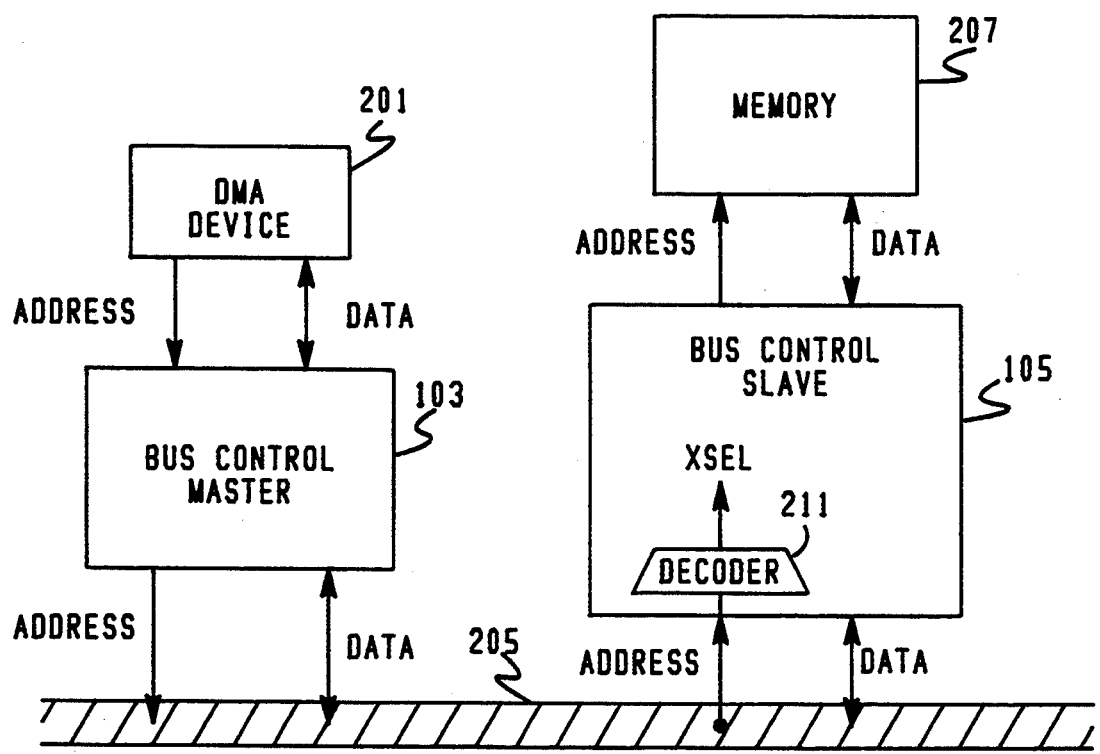
FIG. 2 is a block diagram of a typical bus control master and bus control slave in which the invention is useful.

The details of the bus control master and slave are explained as an operation in which a DMA device accesses a memory system either to write data to the memory or to read data from the memory. The particular operation in no way limits the scope of the invention inasmuch as the DMA device and the memory can be replaced by other system devices or resources. In FIG. 2, the bus control master 103 couples a DMA device 201 to a system bus 205. A bus control slave 105 couples the system bus 205 to a memory system 207. In a typical system, there will be many bus masters and many system resources. FIG. 2 illustrates only one bus control master and one bus control slave.

Typically, a DMA device supplies an address for the memory and data to be written into the addressed memory location. In case of a read operation, the address is supplied and the data retrieved from the memory is latched by the DMA device.

The bus control master 103, when it has received a CONTROL GRANTED signal, first addresses the appropriate bus control slave, in this case the bus control slave 105 for the memory 207 by coupling the latter's address from the DMA device 201 to the bus 205. The selection of the bus control slave 105 is accomplished by the bus control master 103 placing the unique slave address on the bus 205 and supplying a signal indicating the slave address is active. Each bus control slave coupled to the bus 205 includes a decoder 211. When the selected bus control slave receives its unique device address, its decoder 211, together with the slave address active signal, supplies a transfer select signal, XSEL, to the bus control slave's internal state machine, described in detail below.

The XSEL signal signifies that the address signals on the bus from the DMA device 201 to a memory location in the memory 207 are valid. If a write operation is being performed by the DMA device 201, the write data signals from the DMA on the bus are also valid.

When the bus control slave 105 has synchronized the XSEL signal from the bus control master 103 to the local clock of the bus control slave 105, the latter performs its assigned function, usually a read or write operation in the memory 207. When it has completed the function, it returns a transfer acknowledgement signal, XACK, to the bus control master 103. When the bus control master receives the XACK signal, it latches the data signals from the bus 205 if a read operation is in progress.

In a write operation, the bus control slave 105 couples the address from the bus 205 to the address input terminals of the memory 207, activates the memory write signal, and couples the data signals from the bus 205 to the data terminals of the memory 207. When the data has been transferred to the memory 207 or latched in the bus control slave 105 for later transfer, the bus control slave supplies an XACK signal. The address and data signals are coupled from the DMA device 201 to the bus 205 by the bus control master 103.

In a read operation, the bus control slave 105 retrieves the data from the memory at a location addressed by the address signals from the bus 205 supplied by the DMA device 201 and coupled to the memory 207 by the bus control slave 105. The XACK signal indicates to the bus control master 103 that the data is ready. The latter then latches the data signals from the bus 205 or causes the DMA device 201 to do so.

After the cycle is completed, the bus control master 103 may send another data word, i.e., a set of bits equal to the memory word size, to be written at a successive address, the address being incremented by the device 201 or by the bus control master. Successive cycles without additional arbitration is called bursting Fast, buffered DMA devices usually access the memory for bursts of several cycles to store or to read several data words in successive cycles. Slower devices usually access the memory for a single cycle to read or to store a single word.

Figure 3:
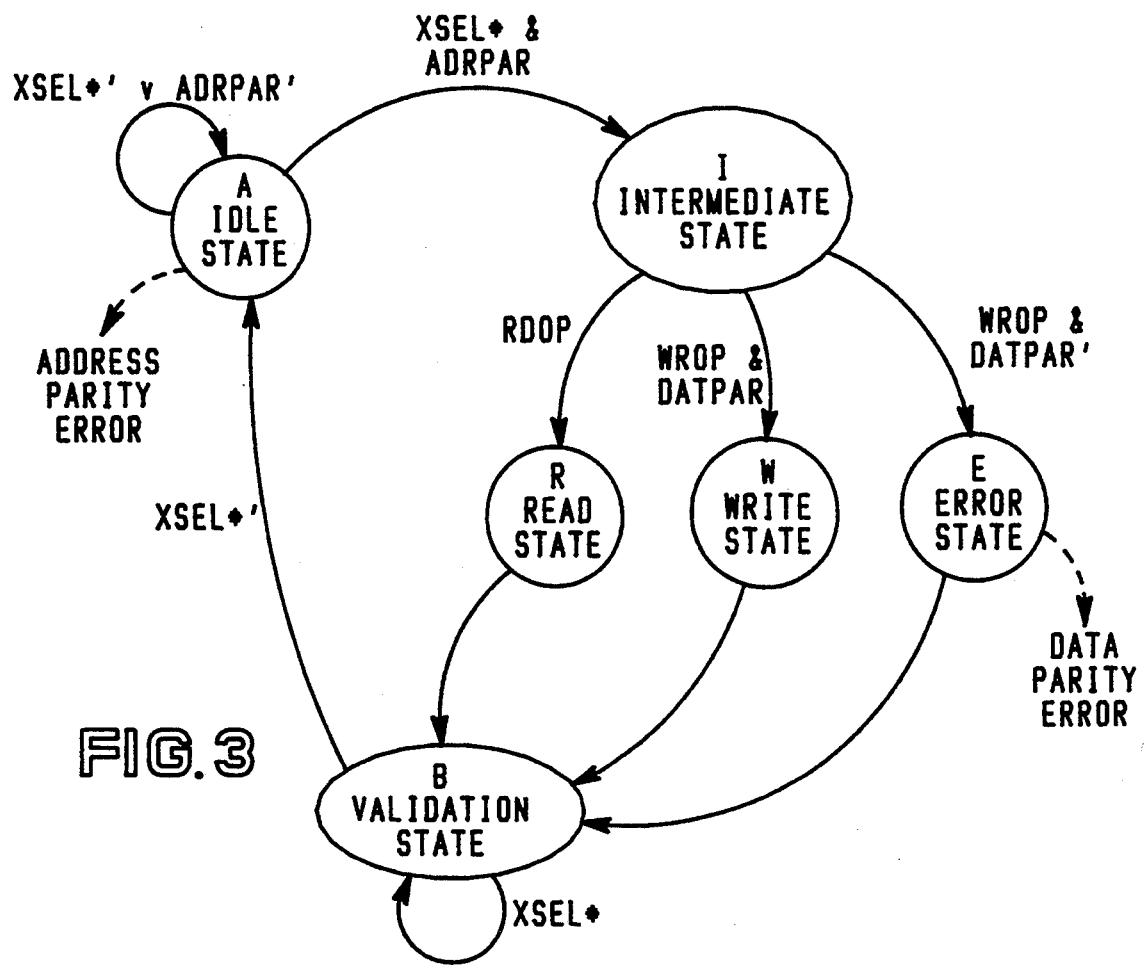
FIG. 3 is a state diagram of a bus control slave state machine for sequencing the latter's functions according to the invention.

The state machine that controls the bus control slave is set out in FIG. 3 in diagrammatic form from which a person of ordinary skill can construct the device. The signals used in the bus control slave state machine are:

ADRPAR—parity of the address signal is correct (ADRPAR' indicates an address parity error);

BG*—bus grant synchronized (see cross-related application for example of a source of this signal);

DATPAR—parity of the data is correct;

RDOP—read operation is being executed;

WROP—write operation is being executed;

XSEL—select signal from the active bus control master which can be the output signal generated by the decoded address and a "slave address active" signal; and XSEL*—the select signal synchronized with the local bus control slave clock.

Figure 4:
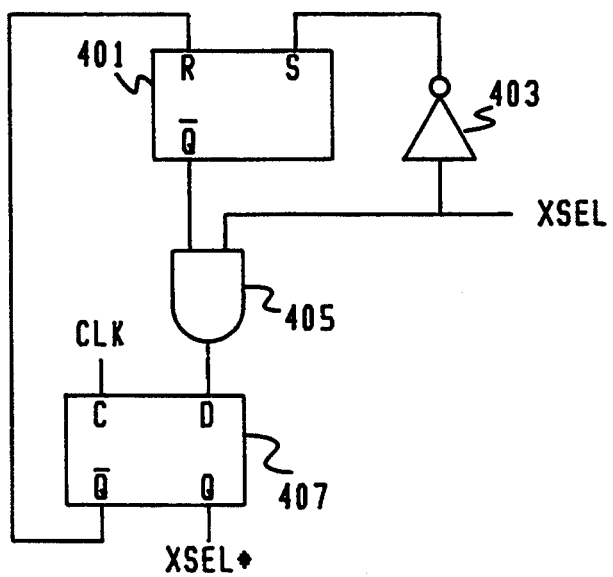
FIG. 4 is a logic diagram of the asynchronous lockout circuit for a bus control slave according to the invention.

The last signal, i.e., XSEL*, is synchronized by a circuit such as shown in FIG. 4. The XSEL signal is received from the decoder and applied to an inverter 403 and an AND gate 405. When the XSEL signal is not present, a flip-flop 401 is reset by the reset output signal from another flip-flop 407. When the XSEL signal is applied to the AND gate 405, the D-input of the flip-flop 407 is primed and the flip-flop is set by the next CLK, local clock, signal. (The CLK signal is used in the bus control slave only and is independent from all other clocks in the system.) Setting the flip-flop 407 produces the XSEL* signal.

In FIG. 3, the first state is the A-state, or idle state. The state machine remains in the A-state so long as XSEL* is inactive or the address parity check is not valid (ADRPAR'). The latter condition prevents the bus control slave state machine from moving out of the idle state when the address has a parity error which means that the particular bus control slave is not actually being selected or that more than one bus control slave may have been selected because of the parity error.

When the XSEL* signal is generated at the first local clock signal after XSEL is received and the address is correct (ADRPAR), i.e., no parity error, the machine transits to the I-state. The I-state is an intermediate state that controls transition to one of three transient states.

If a read operation is being executed, i.e., the RDOP signal is active, then the machine moves from the I-state to the R-state which gates the read data to the bus and immediately goes to the B-state.

If a write operation is being executed, the machine goes to the W-state if the data from the bus, which is to be written to the resource, is valid (DATPAR), i.e., has no parity error. The data on the bus is latched and the machine moves immediately to the B-state.

If a write operation is being executed and the bus data is not valid (DATPAR'), then the machine goes to an E-state which does not latch the data from the bus but generates a data parity error signal. The error signal can be used by the system to initiate diagnostic or recovery procedures as necessary. The error signals are also supplied to the active bus control master. From the E-state the machine goes immediately to the B-state.

In the B-state, the machine generates an XACK signal to the active bus control master. The relation of the signals discussed is shown in FIG. 8. FIG. 8C shows the read data signals on the bus 205. The cross-hatched portion of the signal indicates that the data on the bus is not valid. FIG. 8E shows the XACK signal generated in the B-state to indicate the read data on the bus is valid.

During a write operation, the XACK signal indicates to the bus control master that the write data has been latched from the bus. The data error signal will indicate that the operation was not successful.

When the bus control slave has completed its operation, the XACK signal is deactivated. The bus control slave state machine remains in the B-state while the XSEL* is active. The XSEL* signal will remain active until the first local clock after the XSEL signal is deactivated. This is shown in FIG. 4. When the XSEL signal is deactivated, the output signal from the inverter 403 sets the flip-flop 401 which disables the AND gate 405. When the next CLK signal occurs, the flip-flop 407 is reset, terminating the XSEL* signal. The flip-flop 401 prevents another XSEL from keeping the XSEL* signal active if it occurs before the next local clock signal, CLK.

This circuit insures that the state machine of FIG. 3 returns to the A-state before another XSEL signal can be responded to by the same bus control slave.

The state machine for bus control master is shown in FIG. 5. Its operation begins in the D-state which is entered from the C-state of the arbitration logic of the cross-related application. The bus control master state machine remains in the D-state if the XACK* signal is active. The XACK signal from a bus control slave indicates that the bus control slave is still in an active state from a previous active cycle.

Figure 7:
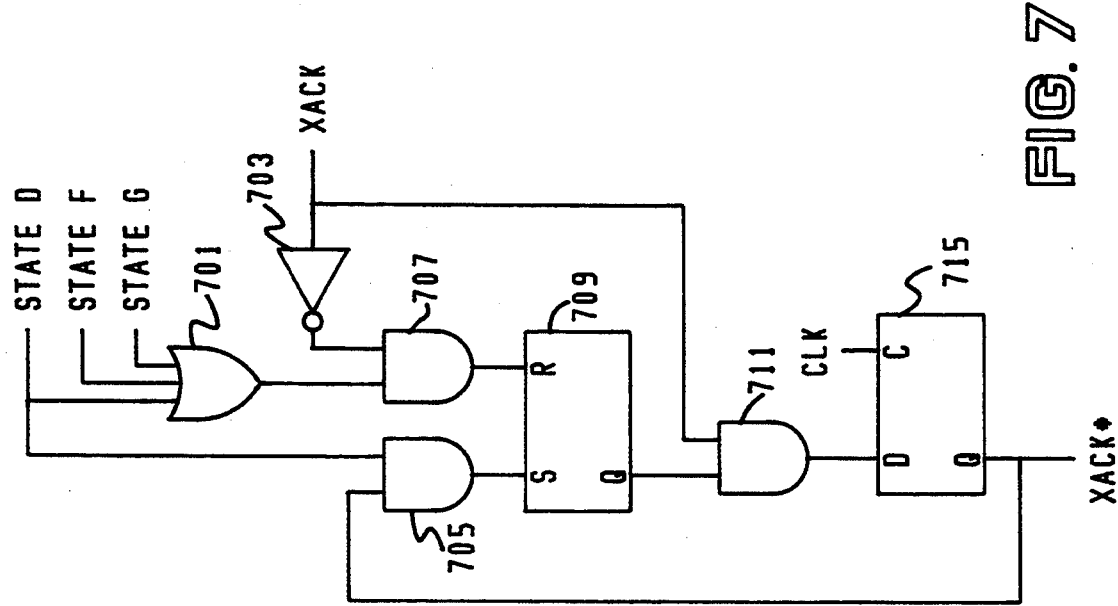
FIG. 7 is a logic diagram of the asynchronous lockout circuit for a bus control master according to the invention.

The XACK* signal is the XACK synchronized with the bus control master's local clock, which, like the other local clocks, is independent from any other clock and is used in the bus control master only. The circuit of FIG. 7 shows the generation of the XACK* signal from the XACK signal from the bus control slave.

The XACK signal from the bus control slave indicates the read data is valid on the bus or that the write data has been latched from the bus. At the bus control master, the XACK signal is applied to an inverter 703 and an AND gate 711. The circuit operates in a manner similar to that of FIG. 4 except that the set and reset signals of the flip-flop 709 are gated only during certain states of the bus control master state machine. The flip-flop 709 is set when the state machine is in the D-state when the flip-flop 715 is set. When the XACK signal is received, the AND gate 711 is activated so that the next local clock signal will set the flip-flop 715, generating the XACK* signal.

When the XACK signal is deactivated, the flip-flop 709 will be reset through an AND gate 707 if the bus control master state machine is in the D-, F-, or G-state. This will disable the AND gate 711 so that the next local clock signal will reset the flip-flop 715, cutting off the XACK* signal. As will be seen from the description of the bus control master state machine, below, the holdoff of the XACK* permits the bus control master state machine to return to a stable state and prevents it from responding to a XACK signal from a previous cycle.

In the state machine of FIG. 5, a LOCK signal is turned on if the bus master is to operate in the burst mode, i.e., the bus master will control the bus for more than one cycle to transfer several words of data. The burst mode will also set a signal ADRINC to cause the address of the data to be incremented when the D-state is entered. If the operation is a write function, the WROP signal will activate the PARACT signal. These signals are ancillary to the proper operation of the bus control master, but do not form part of the invention per se.

When the XACK* is deactivated in the burst mode—for a single cycle operation, it would already have been deactivated or not activated at all—the bus control master state machine transits to the E-state, a wait state. The machine remains in the E-state as long as neither the XACK* or TMOUT signals are active. The TMOUT is a signal that is activated a predetermined time period after the XSEL signal is generated by the bus control master if an XACK signal is not received. This prevents lock up if no XACK signal is received, e.g., if the address parity was incorrect or no bus control slave was selected or the selected bus slave is malfunctioning.

Activation of the XACK* signal will cause the machine to transit to the F-state if the TMOUT signal is not activated and there is no error, i.e., the NOERR signal is active.

The F-state is the action state in that the read data is latched from the bus if a read operation is being executed.

Figure 6:
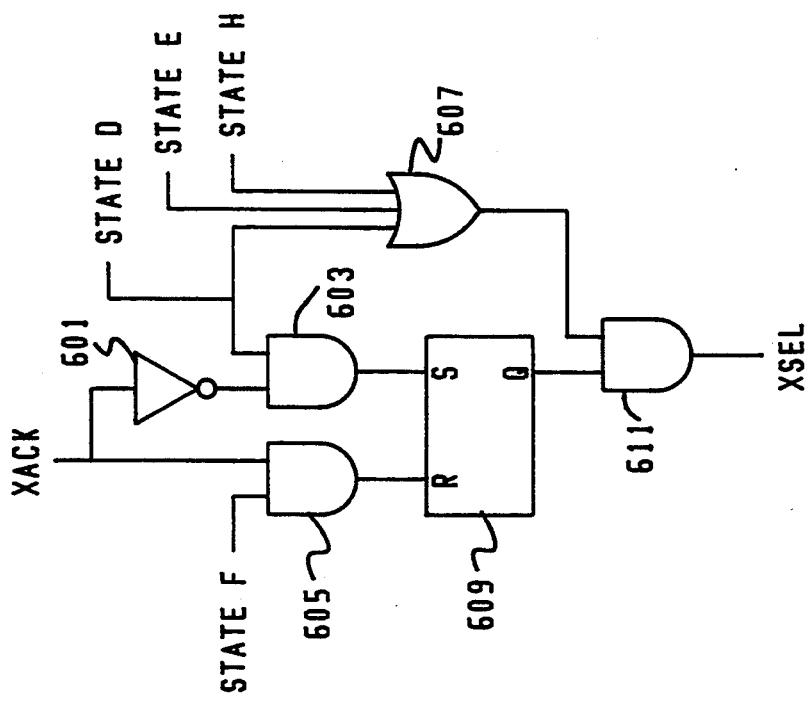
FIG. 6 is a logic diagram of the asynchronous XSEL circuit of a bus control master according to the invention.

FIG. 6 shows the generation of the XSEL signal. If no XACK signal is active (the normal condition), an inverter 601 supplies an active output signal that primes an AND gate 603. The AND gate 603 will be activated to set a flip-flop 609 when the bus control master state machine is in the D-state. With the flip-flop 609 set, the XSEL signal is supplied by an AND gate 611 while the bus control master state machine is in the D-, E-, or H-states via an OR gate 607.

As shown in FIG. 8, the XSEL signal (FIG. 8A) indicates that the address signals on the bus are valid. If a write operation, the write data (FIG. 8D) is also valid. (As noted above, the cross-hatch portions of the signals indicate that the data is not valid.)

The deactivation of the XACK* signal and no LOCK signal causes the bus control master state machine to transit to the A-state, the initial state of the arbitration logic shown in the cross-related patent application.

If the LOCK signal is active in the F-state, the machine moves to the D-state if a read operation is being executed so that the bus control master takes the next cycle without going through the arbitration process. If a write operation is being executed, the machine passes through a transient G-state to the D-state. In the G-state, the write data is prefetched for application to the bus. If the ADRINC signal is active, the write data address is incremented.

The above-described process is repeated if the LOCK signal is active. The LOCK signal is supplied externally to the remote resource to inhibit another arbitration.

From the E-state, a time out signal, TMOUT or an error signal (ERR) when XACK* is active will cause the state machine to transit to an H-state. An error signal, ERROR, is an address parity error signal from the bus control slave or a data parity error during a write operation from the bus control slave. An address parity error may mean that more one bus control slave has responded, i.e., XACK* signal may have been received from more than one bus control slave.

The H-state may also be entered from the D-state if the XACK, TMOUT, and LOCK signals are all active.

The H-state deactivates the LOCK signal so that the next cycle will arbitrated. While the BG* signal remains active, the machine stays in the H-state. When the BG* signal is deactivated, the bus control master state machine transits to the F-state which moves to the A-state since the condition LOCK' is active.

FIG. 6 shows that the XSEL signal remains active during the D-, E-, and H-states. It is, however, cut off in the F-state. This indicates to the bus control slave that the operation has been completed and to deactivate the XACK signal. This releases the bus immediately after the bus control master and slave have completed their operations. It also holds off the setting of the flip-flop 609 until the XACK signal has been deactivated. This prevents the next cycle in the burst mode from bringing up the XSEL signal until the XACK signal from the previous cycle has signalled that the bus control slave operation has been completed.

The description of the preferred embodiment has shown the manner in which a plurality of bus control masters and bus control slaves can operate on an asynchronous basis and permit early release of the bus without synchronizing the trailing edge of the control signals with the local clock. It also shows an arrangement whereby bus control masters and bus control slaves of varying speeds can operate on the same bus.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a data processing system, the combination comprising:

memory means for storing data;

a plurality of data resource means for supplying and utilizing data;

system bus means for transferring data between the memory means and the data resource means;

a plurality of bus master controller means for controlling access to the system bus means by the data resource means, each bus master controller means further comprising clock means, independent of any other clock means employed in the system, for supplying local timing signals for use only in and by the respective means of its associated bus master controller means, bus control master means for coupling a data resource means to the system bus means, bus request means responsive to the bus control master means for supplying a control request signal indicating access to the system bus means is required, select means for receiving a bus grant signal representing access to the system bus means is granted, passing means responsive to the bus request means and to the select means for outputting the bus grant signal if the bus controller means did not supply a control request signal as gated solely by signals from the clock means, and bus control slave means responsive to the bus control master means for coupling the system bus means to the memory means and responsive to the bus request means and to the select means for controlling the system bus means in response to a bus grant signal if the bus controller means supplied a control request signal;

means for coupling the bus request means together to a single bus, which bus will carry bus request signals from any of the bus request means;

means for coupling the passing means of each bus master controller means to the select means of a successive bus controller means, the select means of a first one of said bus master controller means being coupled to receive a bus grant signal from the utilizing means;

signal means in the bus control slave means for supplying a completion signal indicating a data transfer is completed; and termination means in the bus control master means responsive to the clock means and to the signal means for retaining control of the system bus until the bus master controller means has reached a predetermined state.

2. The system combination according to claim 1 wherein the termination means further comprises:

setting means responsive to the clock means and to the absence of a completion signal for activating a continuation signal indicating retention of control of the system bus means; and resetting means responsive to the clock means and to the presence of a completion signal for deactivating the continuation signal.

3. The system combination according to claim 2 wherein each bus master controller means further comprises state control means having a plurality of distinct states for supplying signals to control operation of the bus master controller means in accordance with the current state of the state control means.

* * * * *